(12) United States Patent
Kashima

(10) Patent No.: US 7,626,490 B2
(45) Date of Patent: Dec. 1, 2009

(54) INFORMATION PROVIDING APPARATUS AND METHOD

(75) Inventor: Hiroyuki Kashima, Machida (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 375 days.

(21) Appl. No.: 11/755,813

(22) Filed: May 31, 2007

(65) Prior Publication Data

US 2007/0296543 A1    Dec. 27, 2007

(30) Foreign Application Priority Data

Jun. 23, 2006  (JP) .............................. 2006-173531

(51) Int. Cl.
*B60Q 1/00* (2006.01)
*H04L 12/58* (2006.01)

(52) U.S. Cl. .................. 340/435; 340/426.19; 340/438; 340/539.13; 340/7.52; 340/7.48; 701/29; 701/35; 342/357.07; 455/412.1; 455/412.2

(58) Field of Classification Search .................. 340/435
See application file for complete search history.

(56) References Cited

U.S. PATENT DOCUMENTS

| 6,298,231 | B1 * | 10/2001 | Heinz .......................... 455/413 |
| 6,901,252 | B2 * | 5/2005 | Litwin ...................... 455/414.1 |
| 6,963,274 | B2 * | 11/2005 | Saheki et al. ............... 340/447 |
| 7,139,551 | B2 * | 11/2006 | Jamadagni ............... 455/412.1 |

FOREIGN PATENT DOCUMENTS

JP    2005-051490    2/2005

* cited by examiner

*Primary Examiner*—Donnie L Crosland
(74) *Attorney, Agent, or Firm*—Young Basile (57) ABSTRACT

If an information sending request is received from an information terminal via a data communication connection before search for information requested by the information terminal via a voice communication connection is finished, the sending of the information to the information terminal is prohibited. This prevents old information from being transmitted to the information terminal in response to the information sending request.

20 Claims, 7 Drawing Sheets

FIG. 7

INFORMATION PROVIDING APPARATUS AND METHOD

CROSS-REFERENCE TO RELATED APPLICATION

This application claims priority from Japanese Patent Application Serial No. 2006-173531, filed on Jun. 23, 2006, which is incorporated herein in its entirety by reference.

FIELD OF THE INVENTION

The present invention relates to an apparatus and method for providing information to information terminals.

BACKGROUND

Japanese Unexamined Patent Application Publication Number 2005-51490 discloses a system in which, in response to a search request from a user, an operator in an information center searches for information requested by the user and registers the information obtained by searching in a personal storage area (memory). In response to receipt of an information sending request via a data communication connection, the information registered in the personal storage area is sent and downloaded to a vehicle-mounted device. In this system, a technique for regularly establishing the data communication connection while the user is communicating with the operator to report a desired item of information to the operator is known.

SUMMARY

Embodiments of an information providing apparatus and method are taught herein. One example of an information providing apparatus comprises a first memory, at least one communication path in communication with a remote information terminal and a processor. The processor is operable to search for information requested from the remote information terminal using the at least one communication path, store the requested information found through the search in the first memory and prohibit transmission of data to the remote information terminal using the at least one communication path if an information sending request is received from the remote information terminal before the requested information is stored in the first memory.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

For devices and methods for providing information to information terminals in a search or data request as described in Japanese Unexamined Patent Application Publication No. 2005-51490, if the data communication connection is established before the information searched by the information center is registered in the personal storage area, old information registered in the personal storage area is sent to the vehicle-mounted device.

In contrast, according to embodiments of the invention, information is prohibited from being sent to the information terminal if an information sending request is received from the information terminal via a data communication connection before the information searched by the information center is stored in the storage area after receiving a request for information from the information terminal.

Figure 1:
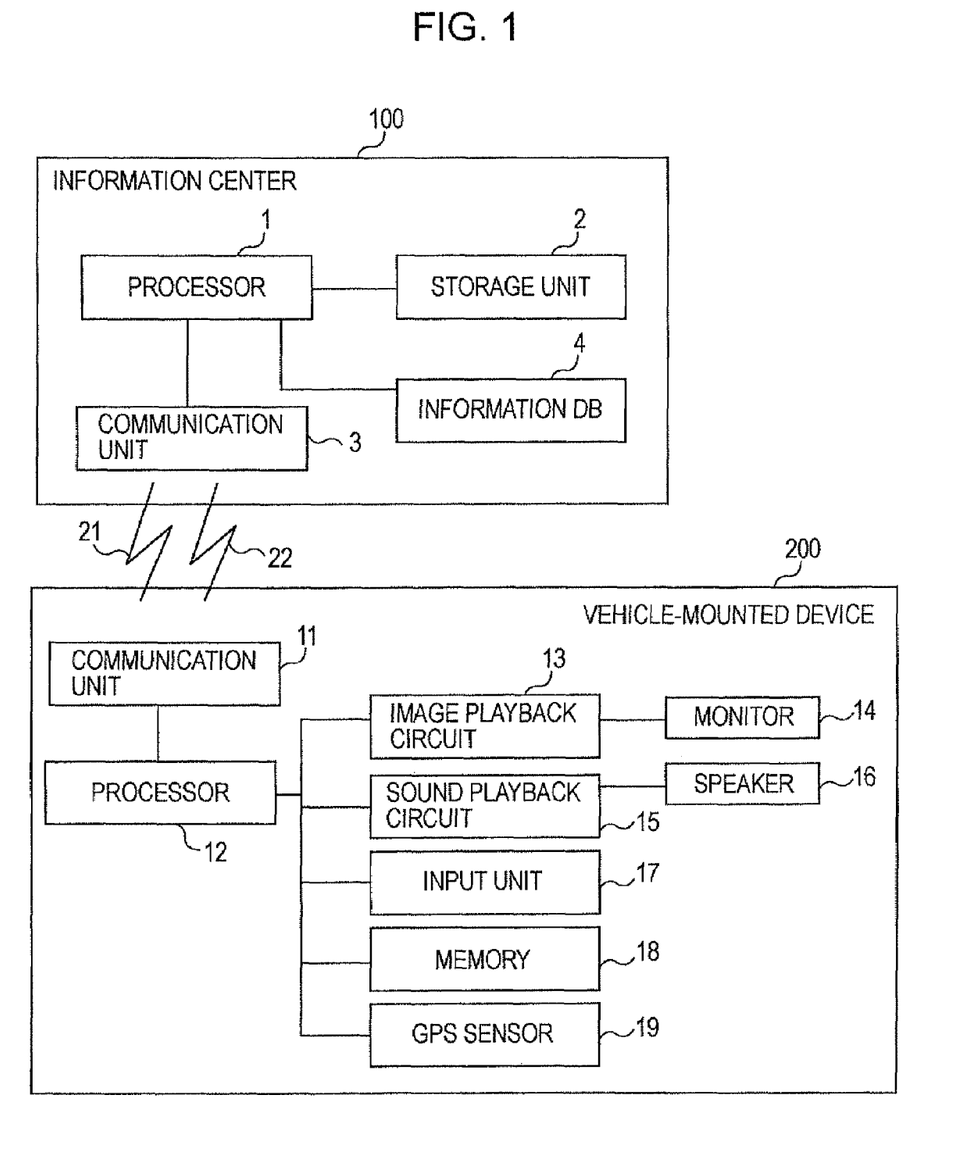
FIG. 1 is a block diagram illustrating the overall configuration of an information providing system including an information providing apparatus according to a first embodiment of the invention.

FIG. 1 illustrates the overall configuration of an information providing system including an information providing apparatus according to a first embodiment of the invention. The information providing system includes an information center 100 and a vehicle-mounted device 200. A user makes a request regarding information that the user wishes to download into the vehicle device 200 to an operator in the information center 100. Then, the operator searches for the information by using a processor 1 and sends the information obtained by searching to the vehicle-mounted device 200 from the information center 100. Although only one vehicle-mounted device 200 is shown in FIG. 1, the information center 100 can communicate with a plurality of vehicle-mounted devices 200. Information to be sent from the information center 100 to the vehicle-mounted device 200 includes, for example, news information, weather forecast information and destination data to be set in the vehicle-mounted device 200, which serves as a car navigation system.

The information center 100 includes the processor 1, a storage unit 2, a communication unit 3 and an information database 4. The communication unit 3 performs wireless communication with a communication unit 11 of the vehicle-mounted device 200. The communication unit 3 can perform simultaneously voice communication via a voice communication connection 21 and data communication via a data communication connection 22. Information searched by the processor 1 is stored in the storage unit 2.

In the information database 4, various items of information to be provided (sent) to the vehicle-mounted device 200 are stored. The information stored in the information database 4 is regularly updated to the latest information. The processor 1 accesses the information database 4 or an information database installed outside the information center 100 to search for information requested by a user and stores the information obtained by searching in the storage unit 2. If an information sending request has been received from the vehicle-mounted device 200, only when a predetermined condition, which is discussed below, is satisfied, is the information stored in the storage unit 2 sent from the communication unit 3 to the communication unit 11 of the vehicle-mounted device 3 via the data communication connection 22.

The vehicle-mounted device 200, which is, for example, a car navigation system, includes a processor 12 that performs processing related to the entirety of the vehicle-mounted device 200, an image playback circuit 13 that plays back image information and displays it on a monitor 14, a sound playback circuit 15 that plays back sound information and outputs it from a speaker 16, an input device 17 that is operated by a user to input information, a memory 18, a global positioning system (GPS) sensor 19 that detects the position of the vehicle and the communication unit 11 that performs wireless communication with the information center 100.

The communication unit 11 is, for example, a cellular telephone and performs voice communication and data communication simultaneously with the communication unit 3 of the information center 100. The processors 1, 12 as shown are microprocessors, but they can also be, for example, integrated controller (a microcomputer) including central processing unit (CPU), input and output ports (I/O), random access memory (RAM), keep alive memory (KAM), a common data bus and read only memory (ROM) as an electronic storage medium for executable programs, etc.

Figure 2:
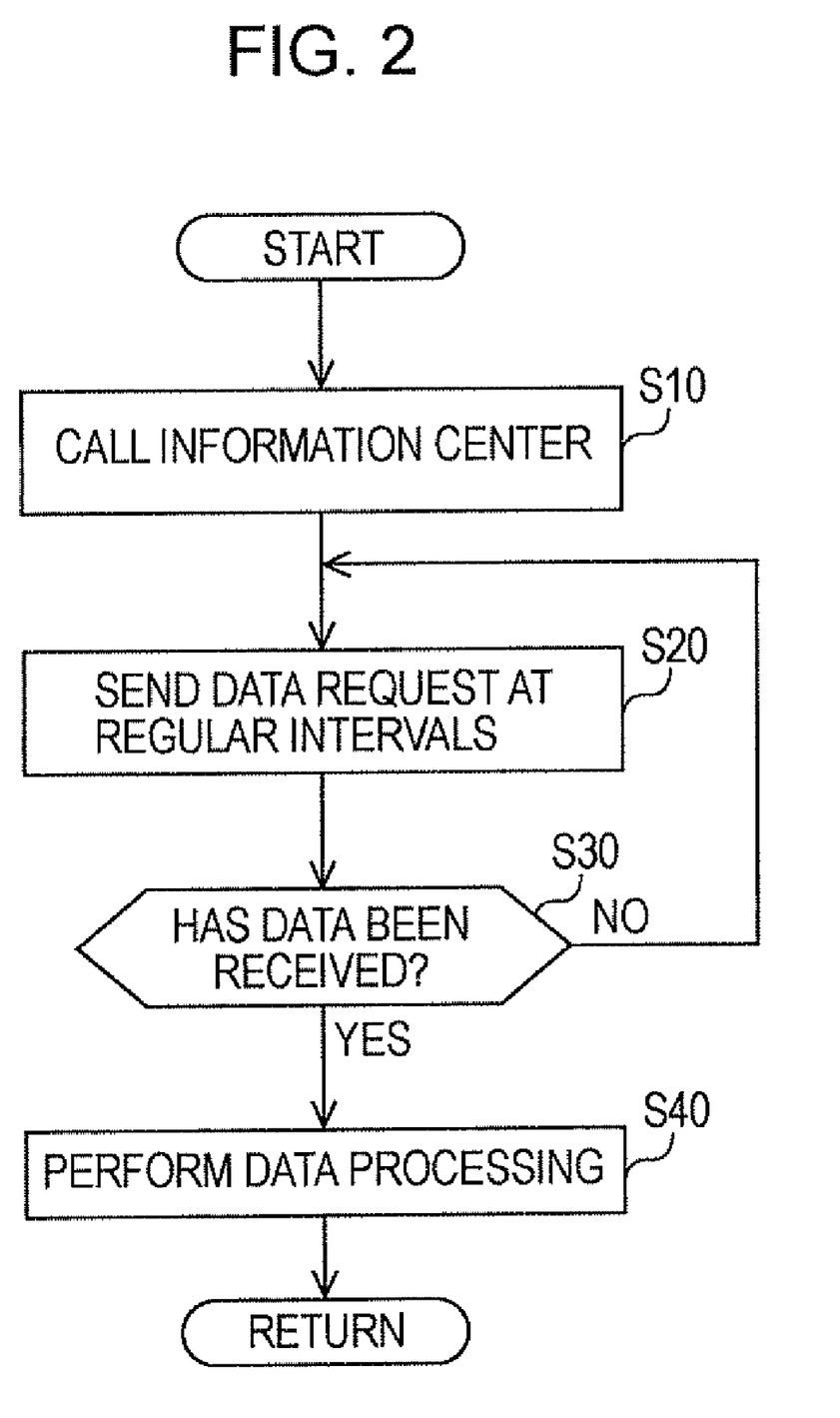
FIG. 2 is a flowchart illustrating processing steps performed by a vehicle-mounted device.

FIG. 2 is a flowchart illustrating processing performed by the vehicle-mounted device 200. When a user presses an operator call button (not shown) contained in the input device 17, the processor 12 of the vehicle-mounted device 200 starts the processing shown in FIG. 2. In step S10 the vehicle-mounted device 200 calls the information center 100 via the communication unit 11. In this case the vehicle-mounted device 200 establishes a connection via the voice communication connection 21 and via the data communication connection 22 simultaneously.

Upon establishing the connection with the communication unit 3 of the information center 100 via the data communication connection 22, user information or vehicle information is sent to the information center 100 from the vehicle-mounted device 200. The user information is information specifying a user, and the vehicle information is information concerning the current position of the vehicle detected by the GPS sensor 19 or information concerning a destination set in the navigation system. Upon establishing the connection with the communication unit 3 of the information center 100 via the voice communication connection 21, the user makes a request regarding information to be downloaded to the vehicle-mounted device 200 to the operator in the information center 100.

In step S20 the vehicle-mounted device 200 sends a data sending request from the communication unit 11 via the data communication connection 22 at regular intervals. As discussed below, only when a download enable flag is ON does the information center 100 permit the vehicle-mounted device 200 to download data. Then, the information center 100 sends information stored in the storage unit 2 to the vehicle-mounted device 200.

In step S30 the vehicle-mounted device 200 determines whether the data has been downloaded from the information center 100. If the data has not been downloaded, the process returns to step S20. If the data has been downloaded, the process proceeds to step S40.

In step S40 the vehicle-mounted device 200 processes the downloaded data. For example, if the downloaded data includes image information, the image information is played back in the image playback circuit 13 and is displayed on the monitor 14. If the downloaded data includes sound information, the sound information is played back in the sound playback circuit 15 and is output from the speaker 16. After processing the downloaded data, the process returns to step S10.

Figure 3:
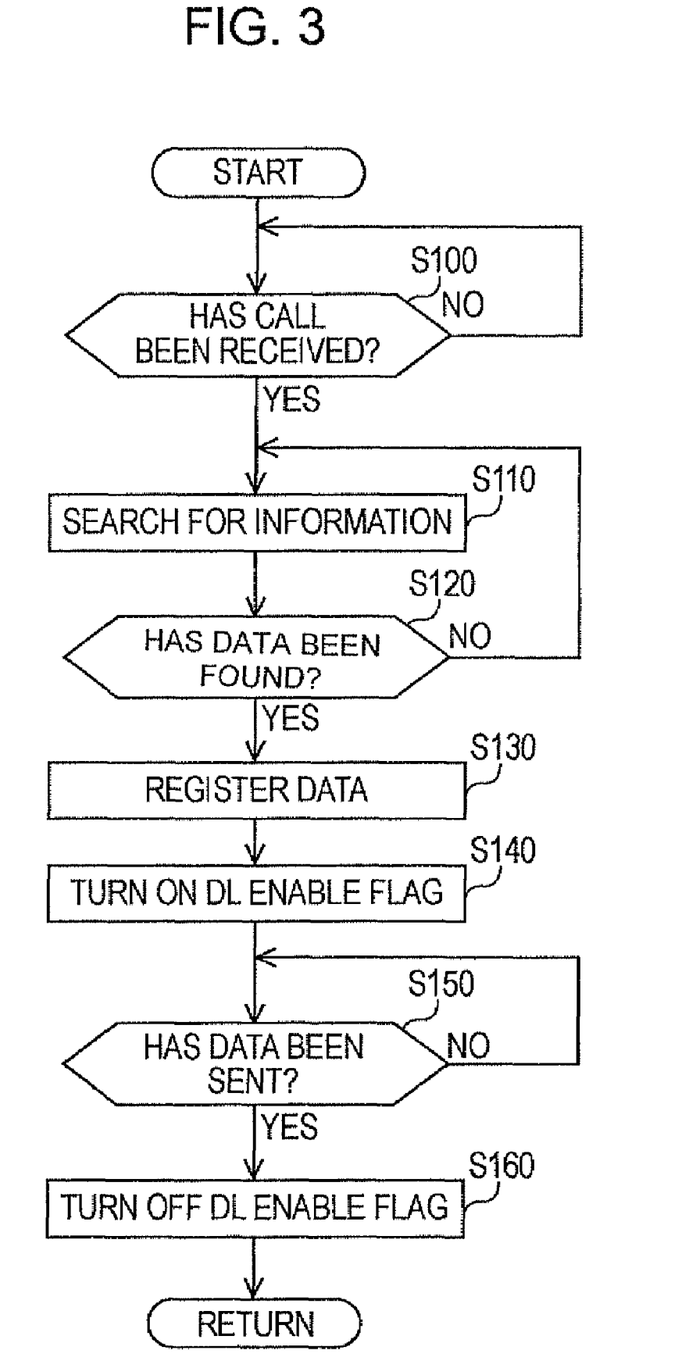
FIG. 3 is a flowchart illustrating processing steps from when a call from a vehicle-mounted device is received until when a download enable flag is turned OFF after data is sent to the vehicle-mounted device.
Figure 4:
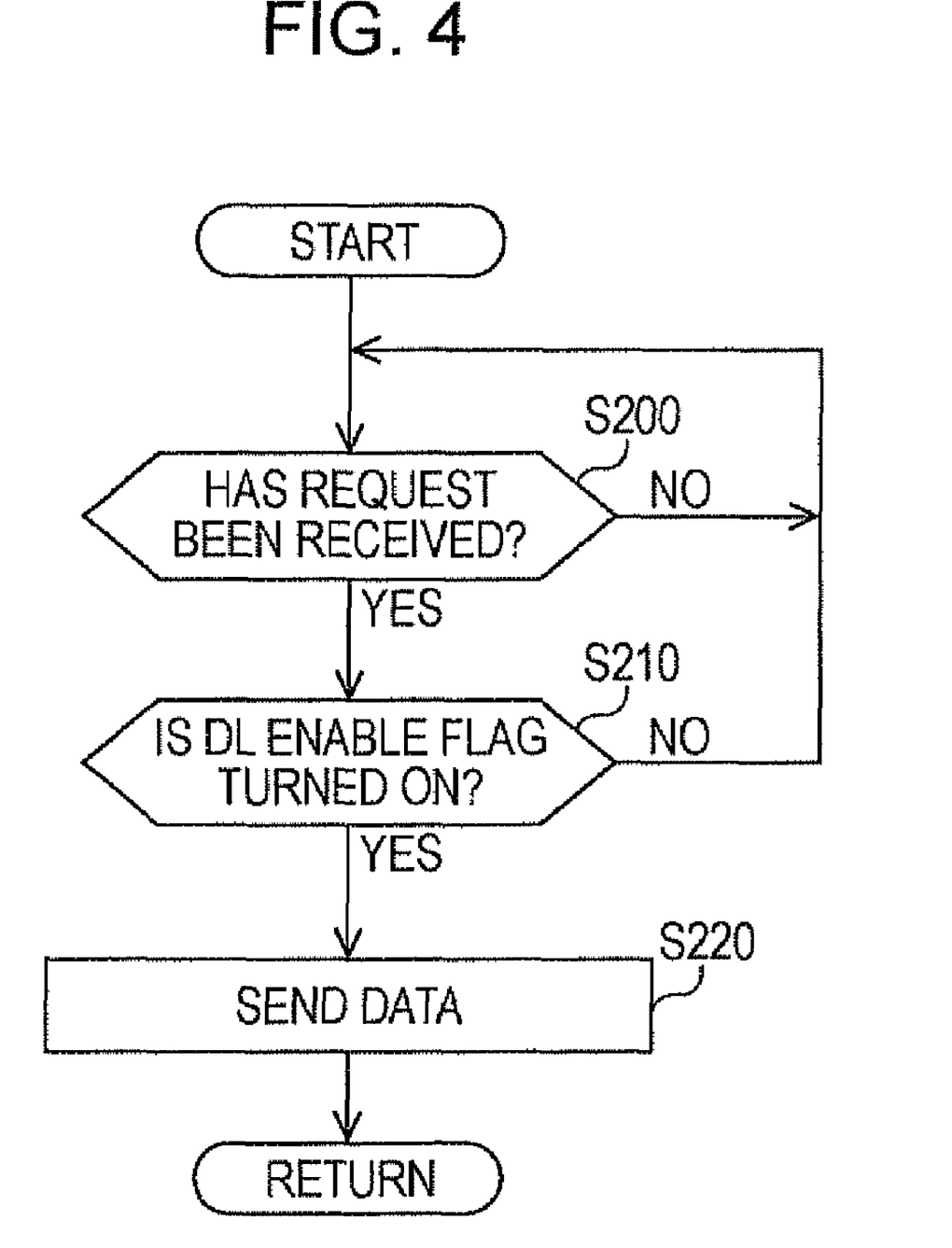
FIG. 4 is a flowchart illustrating processing steps for sending data in response to a data sending request sent from a vehicle-mounted device.

FIGS. 3 and 4 are flowcharts illustrating processing performed by the information center 100. The flowchart in FIG. 3 indicates the processing from when a call from the vehicle-mounted device 200 is received until when the download enable flag is turned OFF after data is sent to the vehicle-mounted device 200. The flowchart in FIG. 4 indicates the processing for sending data in response to receipt of a data sending request from the vehicle-mounted device 200. The processing indicated by the flowchart in FIG. 3 and the processing indicated by the flowchart in FIG. 4 are performed by the processor 1.

In step S100 it is determined whether a call has been received from the vehicle-mounted device 200 by the communication device 3. If there has been no call, the process returns to step S100. If there has been a call, the process proceeds to step S110.

In step S110, a search for the information desired by the user is made. As stated above, upon establishing the connection between the communication unit 11 of the vehicle-mounted device 200 and the communication unit 3 of the information center 100 via the voice communication connection 21, the user makes a request regarding desired information to be downloaded to the vehicle-mounted device 200 to the operator in the information center 100. The operator inputs, for example, a keyword for searching for the information desired by the user into the processor 1. The processor 1 searches for the information based on the input keyword.

In step S120, it is determined whether information (data) to be sent to the vehicle-mounted device 200 has been found. If for example, the operator inputs an instruction to indicate that the data has been found into the processor 1, it is determined in step S120 that the information to be sent to the vehicle-mounted device 200 has been found. Then, the process proceeds to step S130. If it is determined in step S120 that information to be sent to the vehicle-mounted device 200 has not been found, the process returns to step S110.

In step S130 the information obtained by searching is stored (or registered) in the storage unit 2. In this case, the information is stored so as to allow the operator to understand the appropriate vehicle-mounted device 200 to which the information is to be sent. Since user information, for example, has been received from the vehicle-mounted device 200, the information obtained by searching can be stored in association with the user information. Alternatively, a dedicated storage area for each user (each vehicle-mounted device) may be disposed in the storage unit 2, and the search information may be stored in the corresponding dedicated storage area. If information searched by the previous processing is stored in the storage unit 2, it is rewritten by the new information searched by the current processing.

In step S140 the download enable flag is turned ON. As discussed below, the download enable flag is turned OFF after the information is sent to the vehicle-mounted device 200. That is, the download enable flag remains OFF until the information obtained by searching is stored in the storage unit 2.

In step S150 it is determined whether the information stored in the storage unit 2 has been sent to the vehicle-mounted device 200. The processing for sending information to the vehicle-mounted device 200 in response to receipt of an information sending request from the vehicle-mounted device 200 is discussed below with reference to the flowchart in FIG. 4. If it is determined in step S150 that the information has not been sent to the vehicle-mounted device 200, the processor 1 enters the standby state in step S150. If it is determined in step S150 that the information has been sent to the vehicle-mounted device 200, the process proceeds to step S160. In step S160, the download enable flag is turned OFF. Then, the voice communication connection 21 and the data communication connection 22 are interrupted.

The processing indicated by the flowchart in FIG. 4 is executed simultaneously with the processing indicated by the flowchart in FIG. 3. In step S200 it is determined whether an information sending request has been received from the vehicle-mounted device 200 via the data communication connection 22. If an information sending request signal is sent via the data communication connection 22, it is determined in step S200 that an information sending request has been received. The process then proceeds to step S210. If no information sending request has been received from the vehicle-mounted device 200 in step S200, the processor 1 enters the standby state in step S200.

In step S210 it is determined whether the download enable flag is ON. If the download enable flag is found to be OFF, the process returns to step S200. That is, if the download enable flag is OFF, information is not sent to the vehicle-mounted device 200 even if an information sending request is received from the vehicle-mounted device 200. In contrast, if the download enable flag is found to be ON, the process proceeds to step S220. In step S220 the information stored in the storage unit 2 is sent to the vehicle-mounted device 200 from the communication unit 3 via the data communication connection 22. Thereafter, the download enable flag is turned OFF.

If the downloading of information has not been completed normally in the vehicle-mounted device 200 due to the reason of, for example, interruption of the data communication connection 22, the vehicle-mounted device 200 sends an information resending request (re-downloading request) to the information center 100 to resend the information. A resend request may be sent under situations, for example, where the information being obtained (downloaded) into the information terminal after a data communication is established with the information center 100, the data communication is interrupted due to poor communication environment and downloading has not been normally completed. Since part of the data has already been downloaded to the information terminal 200 in a vehicle in response to receipt of the previous sending request, the same information as has already been sent is preferentially sent to the information terminal 200 in response to receipt of the current sending request (resending request). If an information resending request has been received from the vehicle-mounted device 200, the information center 100 resends information, if it is stored in the storage unit 2, to the vehicle-mounted device 200 regardless of whether the download enable flag is ON or OFF. If an information sending request has been received again from the vehicle-mounted device 200 within a predetermined time after sending the information to the vehicle-mounted device 200, the processor 1 of the information center 100 determines that the received information sending request is an information resending request.

According to the information providing apparatus of the first embodiment, the voice communication connection 21 and the data communication connection 22 are simultaneously established, and information requested by the vehicle-mounted device 200 (information terminal) is searched for and stored in the storage unit 2. In response to receipt of an information sending request from the vehicle-mounted device 200 via the data communication connection 22, the information stored in the storage unit 2 is sent to the vehicle-mounted device 200. The sending of information stored in the storage unit 2 is prohibited at least before information searched is stored in the storage unit 2 in response to receipt of an information sending request. When the information obtained by searching is stored in the storage unit 2, the sending of the information stored in the storage unit 2 is permitted. With this configuration, if an information sending request has been received from the vehicle-mounted device 200 via the data communication connection 22, old information searched by previous processing and stored in the storage unit 2 is not sent to the vehicle-mounted device 200.

According to the information providing apparatus of the first embodiment, the necessity of deleting information stored in the storage unit 2 is eliminated. That is, before information obtained by searching is stored in the storage unit 2 in response to receipt of an information sending request, the sending of the information stored in the storage unit 2 is prohibited. Accordingly, even if old information searched by the previous processing remains in the storage unit 2, it is not sent to the vehicle-mounted device 200.

Instead of establishing the voice communication connection 21 and the data communication connection 22 simultaneously, the following procedure may be taken. The data communication connection 22 is first established so that user information or vehicle information is sent to the information center 100. After the data communication connection 22 is interrupted, the voice communication connection 21 is established so that information desired by the user is reported to the operator. After the voice communication connection 21 is interrupted, the data communication connection 22 is reestablished so that the information can be downloaded from the information center 100 to the vehicle-mounted device 200. According to this procedure, however, it takes more time to download information to the vehicle-mounted device 200. In contrast, by simultaneously establishing the voice communication connection 21 and the data communication connection 22, information desired by the user can be downloaded to the vehicle-mounted device 200 speedily.

Figure 5:
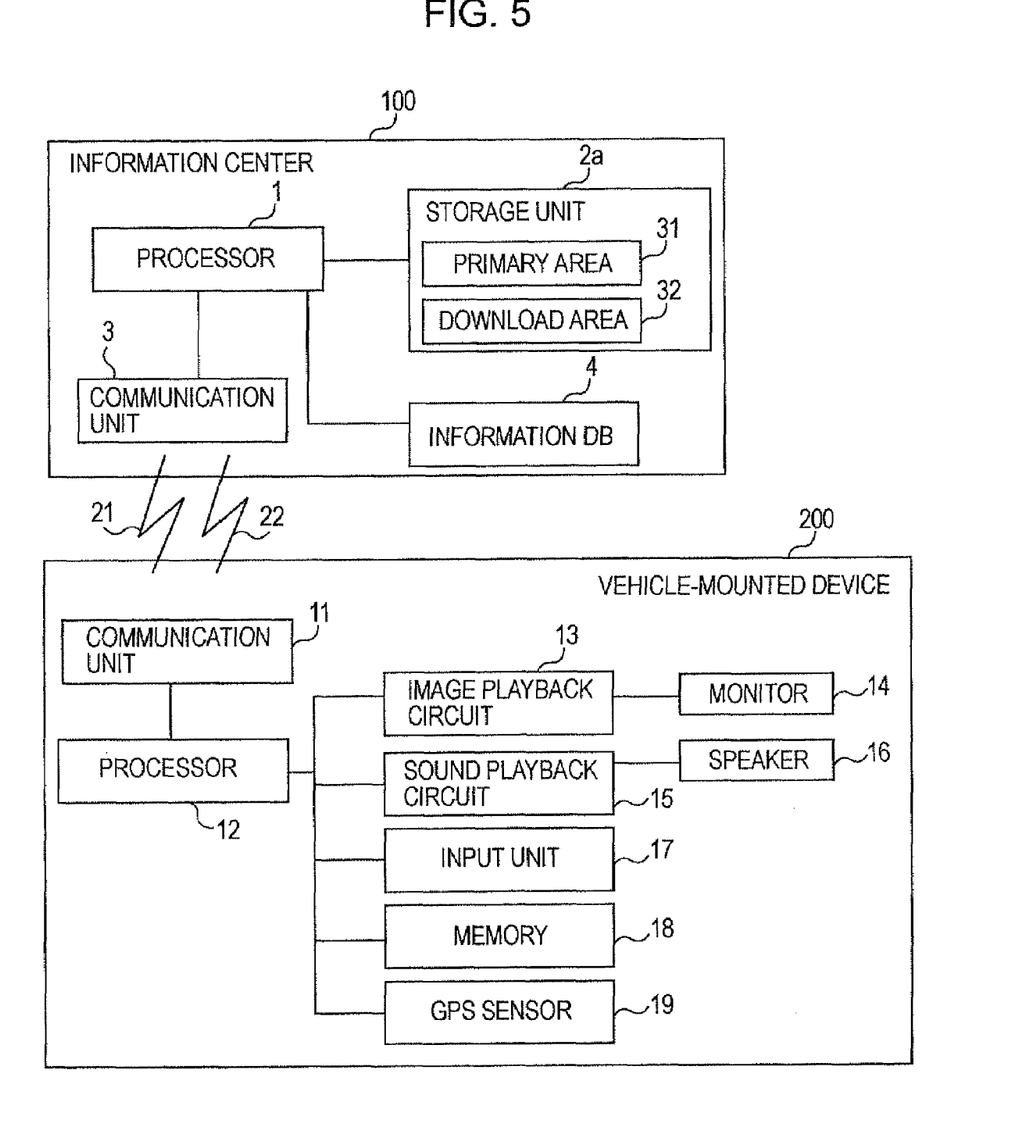
FIG. 5 is a block diagram illustrating the overall configuration of an information providing system including an information providing apparatus according to a second embodiment of the invention.

FIG. 5 illustrates the overall configuration of an information providing system including an information providing apparatus according to a second embodiment of the invention. The information providing system shown in FIG. 5 is different from the counterpart shown in FIG. 1 in that a storage unit 2a of the information center 100 includes a primary area 31 and a download area 32.

In the information providing system of the second embodiment, the processing performed by the vehicle-mounted device 200 is the same as that performed by the vehicle-mounted device 200 of the information providing system of the first embodiment. A description is thus given of only the processing performed by the information center 100.

Figure 6:
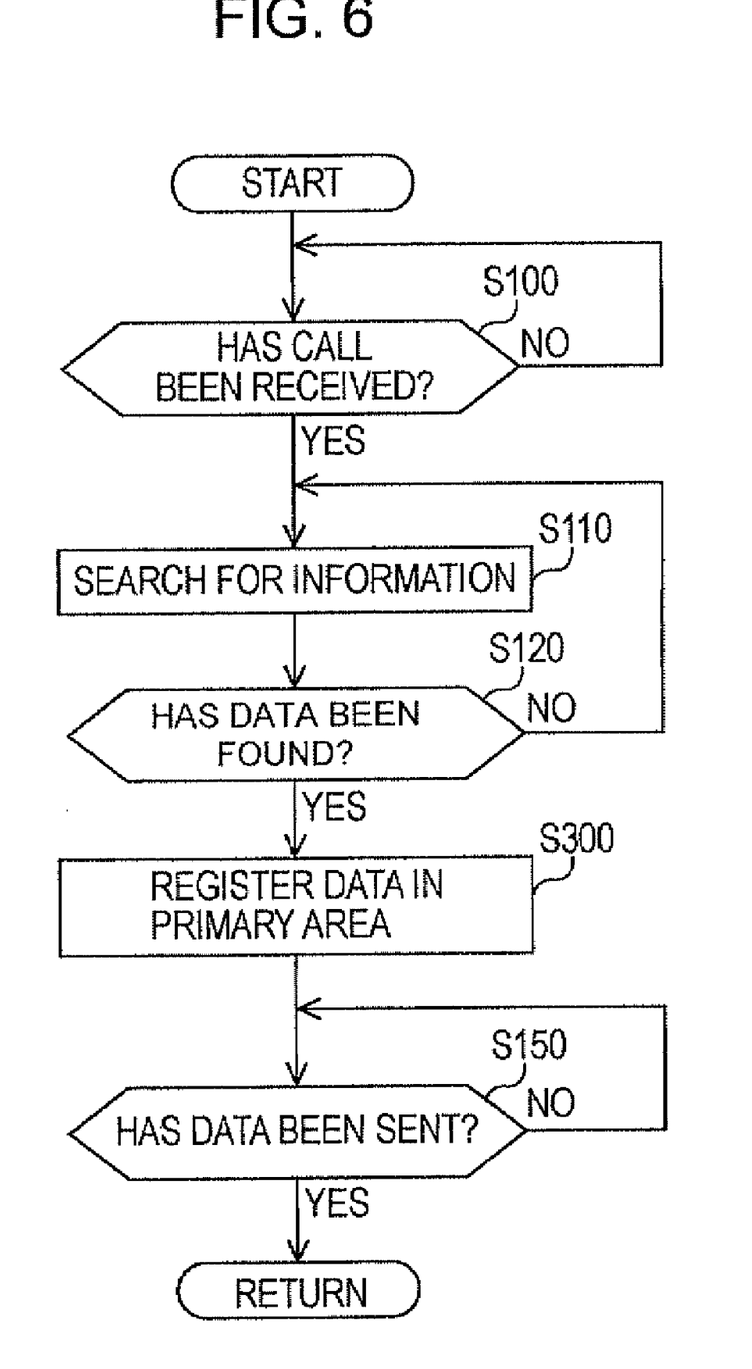
FIG. 6 is a flowchart illustrating processing steps from when a call from a vehicle-mounted device is received until when the sending of data to the vehicle-mounted device is completed.
Figure 7:
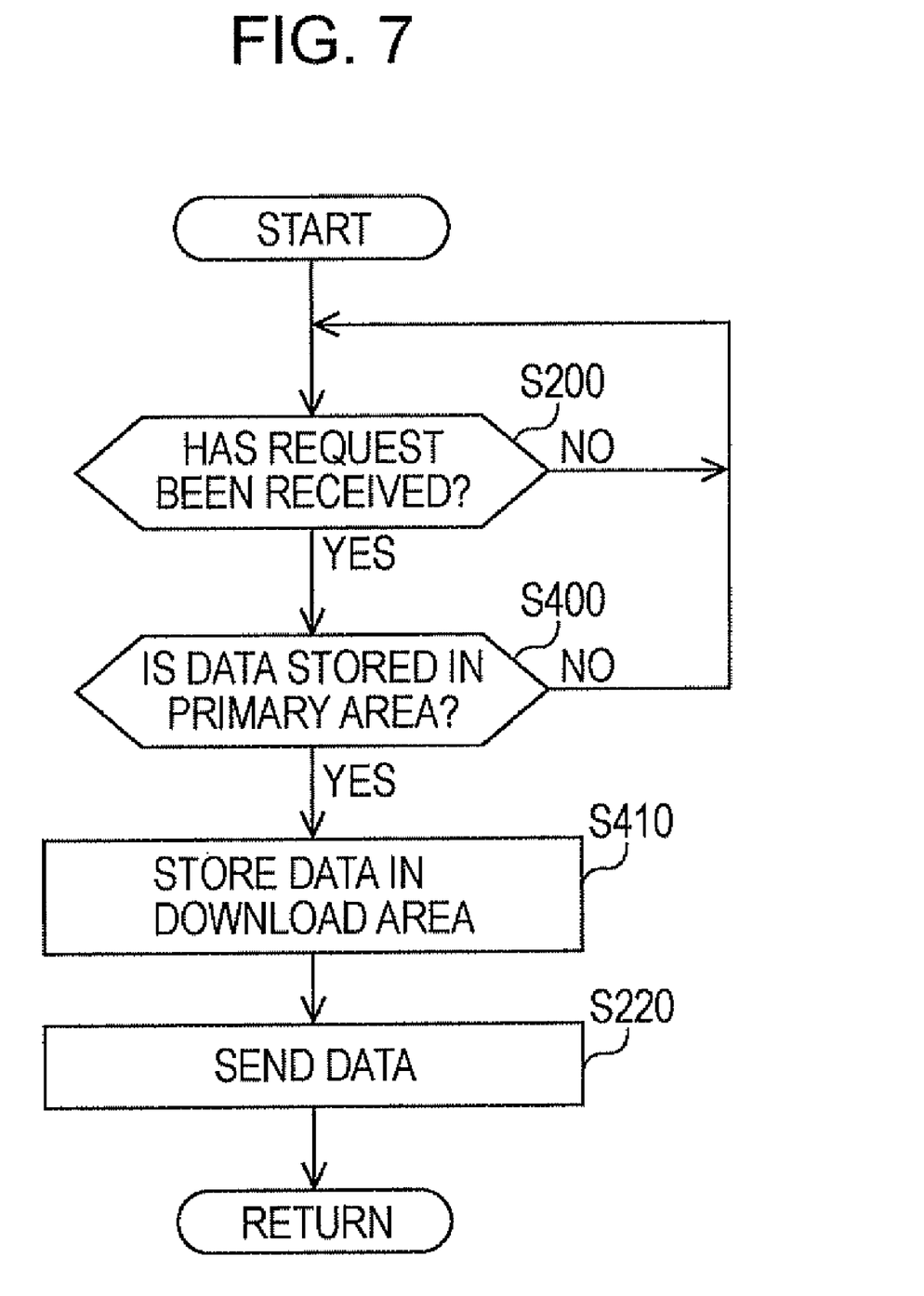
FIG. 7 is a flowchart illustrating processing steps for sending data in response to a data sending request sent from a vehicle-mounted device.

FIGS. 6 and 7 are flowcharts illustrating processing performed by the information center 100. The flowchart in FIG. 6 indicates the processing from when a call from the vehicle-mounted device 200 is received until when the sending of data to the vehicle-mounted device 200 is completed. The flowchart in FIG. 7 indicates the processing for sending data in response to receipt of a data sending request from the vehicle-mounted device 200. The same steps in the flowcharts in FIGS. 6 and 7 as those in the flowchart in FIGS. 3 and 4, respectively, are designated with like step numbers, and an explanation thereof is thus omitted.

Steps S100 through S120 in the flowchart in FIG. 6 are the same as those in the flowchart in FIG. 3. If it is determined in step S120 that data to be sent has been found, the process proceeds to step S300. In step S300, information obtained by searching is stored in the primary area 31 of the storage unit 2*a*, and the process proceeds to step S150 to determine whether the information stored in the storage unit 2*a* has been sent to the vehicle-mounted device 200. If the information has been sent, the voice communication connection 21 and the data communication connection 22 are interrupted, and the process returns to step S100.

The processing indicated by the flowchart in FIG. 7 is executed simultaneously with the processing indicated by the flowchart in FIG. 6. In step S200, it is determined whether an information sending request has been received from the vehicle-mounted device 200. If no information sending request has been received from the vehicle-mounted device 200, the processor 1 enters the standby state in step S200. If an information sending request has been received in step S200, the process proceeds to step S400.

In step S400 it is determined whether information is stored in the primary area 31 of the storage unit 2*a*. If that information is not stored in the primary area 31, the process returns to step S200. That is, the sending of information to the vehicle-mounted device 200 is prohibited. In contrast, if that information is stored in the primary area 31, the process proceeds to step S410. In step S410, the data stored in the primary area 31 is moved to the download area 32. Then, no information is stored in the primary area 31. Then, in step S220, the information stored in the download area 32 of the storage unit 2 is sent to the vehicle-mounted device 200 from the communication unit 3 via the data communication connection 22.

If the downloading of information has not been completed normally in the vehicle-mounted device 200 due to, for example, interruption of the data communication connection 22, the vehicle-mounted device 200 sends an information resending request (re-downloading request) to the information center 100. If an information resending request has been received from the vehicle-mounted device 200, the information center 100 sends data stored in the download area 32 to the vehicle-mounted device 200 without making a determination in step S400, i.e., a determination as to whether data is stored in the primary area 31.

According to the information providing apparatus of the second embodiment, the download area 32 for storing information to be sent to the vehicle-mounted device 200 is provided separately from the primary area 31 for storing information searched by the processor 1. In response to receipt of an information sending request from the vehicle-mounted device 200, if information is stored in the primary area 31, the sending of the information to the vehicle-mounted device 200 is permitted. Also, the information stored in the primary area 31 is moved to the download area 32, and the information stored in the download area 32 is sent to the vehicle-mounted device 200. With this configuration, only when information searched in response to a request is stored in the primary area 31 can it be sent to the vehicle-mounted device 200.

According to the information providing apparatus of the second embodiment, in response to receipt of an information sending request from the vehicle-mounted device 200 via the data communication connection 22, if information is not stored in the primary area 31, the sending of information to the vehicle-mounted device 200 is prohibited. Before storing information obtained by searching in the storage area 31, no information is stored in the primary area 31. Accordingly, even if an information sending request has been received from the vehicle-mounted device 200 via the data communication connection 22, the sending of old information stored in the download area 32 to the vehicle-mounted device 200 can be prevented.

According to the information providing apparatus of the second embodiment, in response to receipt of an information resending request from the vehicle-mounted device 200, the sending of information to the vehicle-mounted device 200 is permitted regardless of whether information is stored in the primary area 31. This makes it possible to speedily resend information after a failure in sending the information.

The invention is not restricted to the first and second embodiments. In these embodiments, for example, in response to receipt of an information resending request from the vehicle-mounted device 200, information stored in the storage unit 2 or the download area 32 of the storage unit 2*a* is sent to the vehicle-mounted device 200. Alternatively, only part of the information that has previously failed to be sent may be resent to the vehicle-mounted device 200. In this case, in the information center 100, an identification (ID) for specifying information is added when the information is stored in the storage unit 2(2*a*). If the vehicle-mounted device 200 has failed to download the entire information due to, for example, interruption of the data communication connection 22 while the information is being downloaded, it reports the ID of the information that has been downloaded and the number of obtained data items forming the information to the information center 100. The information center 100 then specifies the information stored in the download area 32 on the basis of the reported ID. Among items forming the specified information, the information center 100 sends items other than the items obtained by the vehicle-mounted device 200 to the vehicle-mounted device 200.

In the first and second embodiments, information is sent from the information center 100 to the vehicle-mounted device 200. However, the information terminal receiving the information is not limited to the vehicle-mounted device 200 and may be a portable information terminal, e.g., personal digital assistants (PDA).

In the first embodiment, sending of information to the vehicle-mounted device 200 is permitted or prohibited according to whether the download enable flag is ON or OFF, respectively. However, the index to permit or prohibit the sending of information is not restricted to a download enable flag.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An information providing apparatus, comprising:
a first memory;
at least one communication path in communication with a remote information terminal; and
a processor operable to:
search for information requested from the remote information terminal using the at least one communication path;
store the requested information found through the search in the first memory; and
prohibit transmission of data to the remote information terminal using the at least one communication path if an information sending request is received from the remote information terminal before the requested information is stored in the first memory.

2. The apparatus according to claim 1 wherein the processor is further operable to:

permit transmission of data to the remote information terminal in response to receipt of the information sending request when the requested information is stored in the first memory; and prohibit transmission of data to the remote information terminal after the requested information is sent to the remote information terminal.

3. The apparatus according to claim 1 wherein the processor is further operable to:

generate an index; and permit or prohibit transmission of data to the remote information terminal based on a state of the index and in response to receipt of the information sending request from the remote information terminal.

4. The apparatus according to claim 3 wherein the processor is further operable to:

permit transmission of the requested information to the remote information terminal, regardless of the state of the index, if an information resending request is received from the remote information terminal.

5. The apparatus according to claim 1, further comprising:

second memory; and wherein the processor is further operable to:

query if data is stored in the first memory after receipt of the information sending request from the information terminal; and if the data is stored in the first memory, the processor is further operable to:

move the requested information stored in the first memory to the second memory, the data being the requested information; and allow transmission of the requested information from the second memory to the remote information terminal.

6. The apparatus according to claim 5 wherein the processor is further operable to:

prohibit transmission to the remote information terminal using the at least one communication path when a response to the query is that no data is stored in the first memory after receipt of the information sending request from the remote information terminal.

7. The apparatus according to claim 5 wherein the processor is further operable to:

permit transmission of the requested information from the second memory to the remote information terminal using the at least one communication path in response to an information resending request even if a response to the query is that no data is stored in the first memory.

8. The apparatus according to claim 1 wherein the processor is further operable to:

permit transmission of only a part of the requested information in response to receipt of an information resending request wherein the part of the requested information failed to be sent to the remote information terminal in response to a prior information sending request.

9. The apparatus according to claim 1 wherein the at least one communication path includes:

a communication unit;

a voice communication connection, wherein the communication unit is configured to receive requests for the requested information from the remote information terminal via the voice communication connection; and a data communication connection, wherein the communication unit is configured to receive the information sending request from the remote information terminal via the data communication connection.

10. An information providing apparatus, comprising:

information search means for searching for information based on a request from a remote information terminal via a voice communication connection;

first storage means for storing the requested information found by the information search means;

control means for prohibiting transmission of any data to the remote information terminal if an information sending request is received from the remote information terminal via a data communication connection before the requested information found by the information search means is stored in the first storage means after receiving the request from the remote information terminal via the voice communication connection.

11. An information providing apparatus, comprising:

a storage device;

a communication path for sending data stored in the storage device to a remote information terminal; and a processor operable to:

search for information requested from an information terminal via a voice communication connection;

receive an information sending request from the information terminal via the communication path; and permit transmission of the data stored in the storage device to the remote information terminal over the communication path in response to the information sending request when the information sending request is received before the search for the information requested and when the information requested is found and is stored in the storage device as the data.

12. An information providing system, comprising:

an information terminal; and an information providing apparatus including a voice communication connection and a data communication connection established by the information terminal, the information providing apparatus including:

a storage device; and a processor operable to:

search for information requested from the information terminal via the voice communication connection;

store the information requested that is found as a result of the search in the storage device;

receive an information sending request from the information terminal via the data communication connection; and prohibit transmission of data from the storage device to the information terminal if the information sending request is received before the information requested that is found as the result of the search is stored in the storage device; and wherein the information terminal includes:

a display device for displaying the information requested that is received from the information providing apparatus.

13. An information providing method for an information center, comprising:

prohibiting transmission of data from the information center to a remote information terminal if an information sending request is received from the remote information terminal via a data communication connection to the information center before a search for information requested from the remote information terminal via a voice communication connection to the information center is finished.

14. The method according to claim 13, further comprising:
searching for the information requested from the remote information terminal via the voice communication connection; and
storing the information requested in a first memory of the information center; and wherein the search for the information requested from the information terminal is finished when the information requested is stored in a first memory.

15. The method according to claim 13, further comprising:
permitting transmission of data from the information center when the search for the information requested from the remote information terminal is finished; and
prohibiting the transmission of data from the information center to a remote information terminal again after the information requested is sent to the remote information terminal.

16. The method according to claim 13, further comprising:
generating an index for permitting or prohibiting the transmission of data to the remote information terminal;
using the index for determining whether to permit or prohibit the transmission of data to the remote information terminal based on a state of the index and in response to receipt of the information sending request from the remote information terminal.

17. The method according to claim 16, further comprising:
permitting transmission of the information requested to the remote information terminal, regardless of the state of the index, if an information resending request is received from the remote information terminal.

18. The method according to claim 13, further comprising:
querying if data is stored in a first memory after receipt of the information sending request from the information terminal;
moving the information requested that is stored in the first memory to second memory if the data is stored in the first memory, the data being the requested information; and
transmitting the information requested from the second memory to the remote information terminal if the data is stored in the first memory.

19. The method according to claim 17 wherein prohibiting the transmission of data from the information center to the remote information terminal if the information sending request is received from the remote information terminal via the data communication connection to the information center before the search for information requested from the remote information terminal via the voice communication connection to the information center is finished further comprises:
prohibiting the transmission of data to the remote information terminal when a response to the querying is that no data is stored in the first memory after receipt of the information sending request from the remote information terminal.

20. The method according to claim 13, further comprising:
permitting communication means to send only a portion of the information requested in response to receipt of an information resending request wherein the part of the requested information failed to be sent to the remote information terminal in response to a prior information sending request.

* * * * *